(12) United States Patent
Thompson et al.

(10) Patent No.: US 9,950,877 B2
(45) Date of Patent: Apr. 24, 2018

(54) PRODUCT SHIPMENT LOADING AND UNLOADING SYSTEMS AND METHODS

(71) Applicant: Wal-Mart Stores, Inc., Bentonville, AR (US)

(72) Inventors: John P. Thompson, Bentonville, AR (US); Donald R. High, Noel, MO (US); Chandrashekar Natarajan, San Ramon, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/354,171

(22) Filed: Nov. 17, 2016

(65) Prior Publication Data

US 2017/0137235 A1 May 18, 2017

Related U.S. Application Data

(60) Provisional application No. 62/257,091, filed on Nov. 18, 2015.

(51) Int. Cl.
*B65G 54/02* (2006.01)
*B60P 1/52* (2006.01)
*B65G 67/20* (2006.01)

(52) U.S. Cl.
CPC .............. *B65G 54/02* (2013.01); *B60P 1/52* (2013.01); *B65G 67/20* (2013.01); *B65G 2201/0267* (2013.01)

(58) Field of Classification Search
CPC ................................. B65G 54/02; B60P 1/52

(Continued)

(56) References Cited

U.S. PATENT DOCUMENTS 4,197,934 A * 4/1980 Matsui ............... B61B 13/04
  104/287
5,360,470 A * 11/1994 Ono ................. B60L 13/06
  104/284

(Continued)

OTHER PUBLICATIONS

Busch-Vishniac, Iiene; "An Automated Loading and Unloading System for a Maglev Wafer Transport Path"; http://www.researchgate.net/publication/3283391_An_automated_loading_and_unloading_system_for_a_maglev_wafer_transport_path; Spetember 30, 2015; 2 Pages.

(Continued)

*Primary Examiner* — Kaitlin S Joerger
(74) *Attorney, Agent, or Firm* — Fitch, Even, Tabin & Flannery, LLP

(57) ABSTRACT

In some embodiments, systems, apparatuses and methods are provided to aid in the loading and/or unloading of delivery vehicles. Some embodiments provide a product load system, comprising: multiple pallet lift systems configured to enable pallets to be moved in and out of a delivery vehicle, wherein the multiple pallet lift systems comprise a series of pallet lift magnets; a magnetic levitation track comprising a series of track magnets, wherein track is configured to be positioned adjacent a floor of the first delivery vehicle; and a control circuit configured to control an activation of one of the series of pallet lift magnets and the series of track magnets such that magnetic forces established inducing a lifting force on the series of pallet lift magnets, and reduces a force applied by the first pallet on the floor of the delivery vehicle and allows reduced friction movement of the first pallet.

19 Claims, 4 Drawing Sheets

(58) Field of Classification Search
USPC ....... 414/467, 572, 340, 343, 344, 345, 349, 414/351
See application file for complete search history.

(56) References Cited

U.S. PATENT DOCUMENTS

| | | | |
|---|---|---|---|
| 6,129,025 | A | 10/2000 | Minakami |
| 6,520,729 | B1 * | 2/2003 | Gibson .................... B61D 3/04 198/465.2 |
| 8,616,134 | B2 * | 12/2013 | King ..................... B60L 13/003 104/284 |
| 9,126,487 | B2 | 9/2015 | Henderson |
| 9,701,488 | B2 * | 7/2017 | Paweletz ................ B65G 54/02 |
| 2003/0015115 | A1 * | 1/2003 | Lamb ..................... B60L 13/04 104/282 |
| 2006/0045672 | A1 * | 3/2006 | Maynard ................... B25J 5/02 414/276 |
| 2006/0182558 | A1 * | 8/2006 | Frauen ..................... B64F 5/50 414/352 |
| 2013/0026005 | A1 | 1/2013 | Senn |
| 2014/0265960 | A1 | 9/2014 | Sonoda |
| 2017/0137235 | A1 * | 5/2017 | Thompson ............. B65G 54/02 |

OTHER PUBLICATIONS

"Maglev Hoverboard"; http://www.maglev.net/news/maglevhoverboard; Oct. 11, 2011; 6 pages.

* cited by examiner

US 9,950,877 B2

PRODUCT SHIPMENT LOADING AND UNLOADING SYSTEMS AND METHODS

CROSS-REFERENCE TO RELATED APPLICATION

This application claims the benefit of U.S. Provisional Application No. 62/257,091, filed Nov. 18, 2015, which is incorporated herein by reference in its entirety.

TECHNICAL FIELD

This invention relates generally to product loading and unloading.

BACKGROUND

In modern retail environments, there is a need to improve the customer experience and/or convenience for the customer. In a shopping environment, it can be important that product inventory is readily available to customers. Further, the customer experience at the shopping facility can have significant effects on current sales. Providing a pleasant or improved customer experience can lead to customer satisfaction and repeat returns to the shopping location.

There are many ways to improve customer experience. For example, ready access to products can lead to increased customer visits and customer loyalty. The distribution of products to shopping facilities and/or the unloading of products at a distribution facility can affect product availability, workforce needs and other such factors, that can affect sales. Accordingly, it can be advantageous to improve the loading and unloading of delivery vehicles.

BRIEF DESCRIPTION OF THE DRAWINGS

Disclosed herein are embodiments of systems, apparatuses and methods pertaining product loading and unloading of delivery vehicles. This description includes drawings, wherein.

Figure 1:
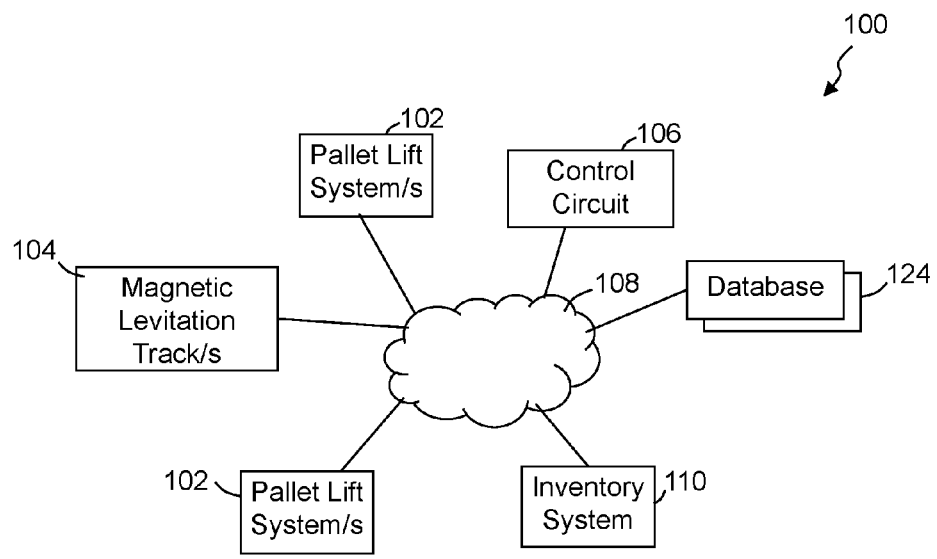
FIG. 1 illustrates a simplified block diagram of an exemplary product load and/or unload system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided to assist and/or simplify the loading and/or unloading of products to and from delivery vehicles. Some embodiments provide product load systems that include multiple pallet lift systems that enable pallets to be moved in and out of a storage area of a delivery vehicle. The pallets, as is common in the retail and other industries, pallets are configured to receive and support products to be shipped by delivery vehicles and/or temporarily stored. Each of the pallet lift systems includes a series of pallet lift magnets that are secured and positioned, at least while in use, to be proximate a surface (e.g., floor of a delivery vehicle, floor of a loading dock, a loading track, etc.) over which the pallets are to be transported. The systems further include one or more magnetic levitation tracks that comprise a series of track magnets. In use, the track is configured to be positioned adjacent a floor of a storage area of a delivery vehicle. Some embodiments further include one or more control circuits that communicatively couple with and sent control signals to control an activation and/or deactivation of the series of pallet lift magnets of a pallet lift system, the series of track magnets, or a combination of the series of pallet lift magnets and the series of track magnets. The activation, in some implementations, of one or both of the series of pallet lift magnets of a pallet lift system and the series of track magnets is in response to a pallet supporting products being positioned relative to the storage area of the delivery vehicle. Further, the activation of one or both of the series of pallet lift magnets of a pallet lift system establishes magnetic forces between the series of pallet lift magnets and the series of track magnets that induce a lifting force on the series of pallet lift magnets. The lifting force further reduces a force applied by the pallet, and one or more products supported by the pallet, on the floor of the storage area of the delivery vehicle and allows reduced friction movement of the pallet along the track and the floor of the storage area of the delivery vehicle.

FIG. 1 illustrates a simplified block diagram of an exemplary product load and/or unload system 100, in accordance with some embodiments. The system 100 includes multiple pallet lift systems 102, one or more magnetic levitation tracks 104, and a product loading and/or unloading control circuit or system 106 that is communicatively coupled with the pallet lift systems 102 and/or the magnetic levitation track systems 104 over one or more wired and/or wireless distributed communication networks 108 (e.g., LAN, WAN, Wi-Fi, Bluetooth, Internet, other such networks, or combination of two or more of such networks). Some embodiments further include an inventory system 110, one or more databases 112, and other potential systems.

The pallet lift systems 102 each are configured to temporarily cooperate with and/or be permanently affixed to a pallet, which is substantially any portable support structure, platform or the like that is capable of temporarily supporting, handling, shipping, and/or storing products, materials and packages, and enabling a forklift, pallet jack and other such typical warehouse lifting systems to move the pallet and supported products, packages and the like (e.g., in distribution centers, shopping facilities, warehouses, factories, vehicles and the such). In some implementations, the pallets typically include a product support surface formed from one or more planks, boards, sheets or the like to receive and support one or more products, crates, packages and the like that are positioned to be transported, shipped, stored and the like.

One or more magnetic levitation tracks 104 (sometimes referred to as simply a track) are configured to be positioned along a route the pallets are to be transported during a loading or unloading process of a delivery vehicle, and/or transported along a route through a warehouse, distribution center, back storage area of a shopping facility, or the like. In some embodiments, one or more magnetic levitation tracks are positioned at least relative to a delivery vehicle to cooperate with the pallet lift systems 102 as pallets are moved on or off of the delivery vehicle. The tracks 104 include a series of track magnets.

The control circuit 106, in part, controls the activation of one or both of the pallet lift systems and the magnetic levitation tracks. The control circuit provides at least some control over the activation of one or both of a magnetic levitation track and/or a pallet lift system while a pallet is being transported relative to the magnetic levitation track. Further, the control circuit may be in communication with the inventory system 110 that identifies products and/or pallets to be loaded and/or unloaded, an order of loading and/or unloading, where products are to be placed upon unloading and/or other information.

Figure 2:
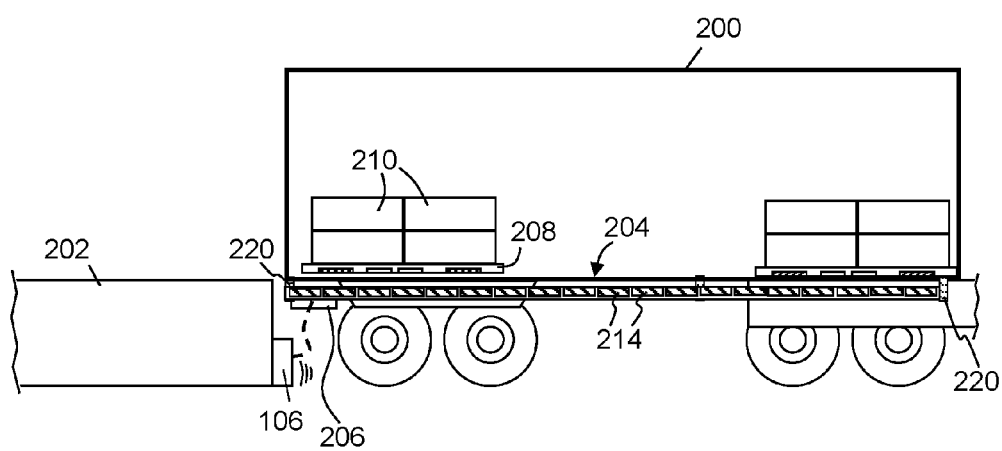
FIG. 2 illustrates a simplified block diagram showing a cross-sectional view of an exemplary product load and/or unload system including one or more exemplary magnetic levitation tracks positioned relative to a delivery vehicle, in accordance with some embodiments.

FIG. 2 illustrates a simplified block diagram showing a cross-sectional view of an exemplary product load and/or unload system 100 with one or more exemplary magnetic levitation tracks 104 positioned relative to a delivery vehicle 200, in accordance with some embodiments. In this example, the delivery vehicle 200 is positioned adjacent a loading dock 202 from which pallets and/or packages can be loaded onto the delivery vehicle 200, and/or onto which pallets and/or packages can be unloaded from the delivery vehicle. The magnetic levitation track 104 is positioned adjacent the floor 204 of a storage area of the delivery vehicle. Further illustrated is a pallet 208, supported products 210, positioned within the storage area of the delivery vehicle while being loaded onto or unloaded from the delivery vehicle. The pallet 208 includes one or more pallet lift systems 102 and/or one or more pallet lift systems are cooperated with the pallet. Additionally, the one or more pallet lift systems are configured to be positioned to magnetically interact with the magnetic levitation track 104 at least when one or both of the pallet lift system and the magnetic levitation track are activated. The one or more pallet lift systems 102 enable pallets supporting products to be moved in and out of the storage area of the delivery vehicle.

Figure 3A:
FIG. 3A illustrates a simplified block diagram, cross-sectional view of an exemplary pallet lift system cooperated with a pallet, in accordance with some embodiments.
Figure 3B:
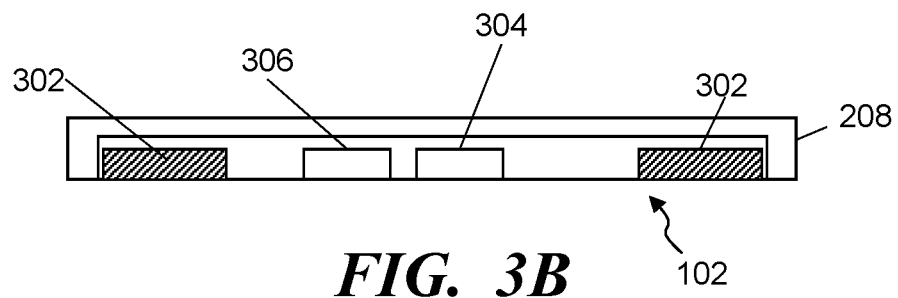
FIG. 3B illustrates a simplified block diagram, cross-sectional view of an exemplary pallet lift system cooperated with a pallet, in accordance with some embodiments.

FIG. 3A illustrates a simplified block diagram, cross-sectional view of an exemplary pallet lift system 102 cooperated with a pallet 208, in accordance with some embodiments. FIG. 3B illustrates a simplified block diagram, cross-sectional view of an exemplary pallet lift system 102 cooperated with a pallet 208, in accordance with some embodiments. Referring to FIGS. 1-3B, the pallet lift system includes a series of pallet lift magnets 302 that are typically spaced to be equally distributed relative to a pallet 208. This distribution provides a substantially uniform lift force on the pallet to maintain the pallet substantially level and typically in parallel with the magnetic levitation track 104 when magnetically interacting with the track. For example, the pallet lift magnets 302 may be two sets of a series of magnets extending along substantially a length of the pallet with a distance separating the sets of magnets. In some instances, each set of magnets may be positioned on opposite sides of the pallet. In other implementations, one or more pallet lift magnets may be positioned proximate each corner of the pallet. Additionally or alternatively, the pallet lift magnets 302 may be positioned in one or more rows comprising one or more arrays of pallet lift magnets arranged in one or more grids. In some embodiments, as illustrated in FIG. 3B, the pallet lift system 102 may a pallet lift system control circuit 306, and optionally a power source 304. The pallet lift system control circuit 306 in part can control the distribution of power from an external source and/or the power source 304 to one or more of the pallet lift magnets 302. the control circuit may further couple with a transceiver (not shown) providing wired and/or wireless communication (e.g., with the control circuit 106). Further, the pallet lift system may optionally include a user interface that allows a work to interact with the pallet lift system, such as activate the pallet lift system control circuit 306, activate distribution of power, and the like.

In some embodiments, one or more pallet lift systems 102 are temporarily cooperated with a pallet 208. Each pallet lift system includes a series of pallet lift magnets being positioned relative to an area of an underside of the pallet (e.g., a support surface upon which the pallet rests when placed on a flat surface). The pallet lift system can include a frame with the pallet lift magnets 302 fixed with the frame. In some implementations, for example, the frame can include two or more extensions secured together by at least one cross-support. Pallet lift magnets 302 are positioned on at least the extensions. The extensions are configured to insert into a pallet or other product support structure such that the pallet lift magnets are positioned to be equally distributed relative to the area of the pallet. One or more locking mechanisms may be included with the frame to temporarily secure the frame with the pallet. One or more wheels may also be cooperated with the frame to allow the pallet lift system 102 to be readily moved to be positioned with a pallet. In some embodiments, one or more motors may be included to aid workers in moving and cooperating the pallet lift system with different pallets. In other implementations, the frame and/or extensions may include fork lift ports that allow forks of a fork lift, pallet jack, or other lift system to be partially inserted into the fork lift ports to move allow the fork lift, pallet jack or the like to temporarily cooperate with the pallet lift system and be able to move the pallet lift system 102 into and out of different pallets 208 as needed.

Figure 4:
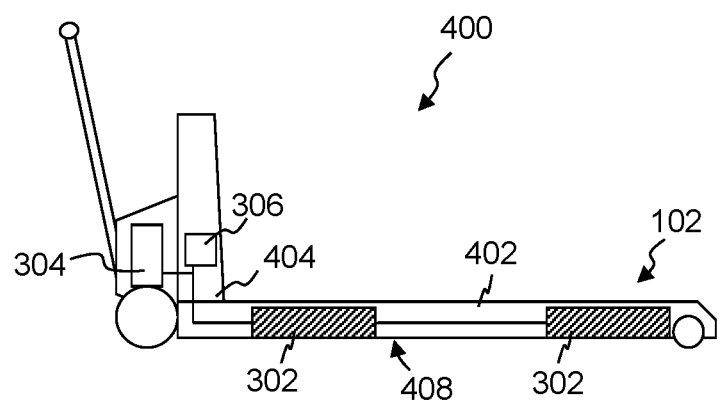
FIG. 4 illustrates a simplified, partial cross-sectional view of an exemplary pallet lift system incorporated with and/or secured to a pallet jack, in accordance with some embodiments.
Figure 5:
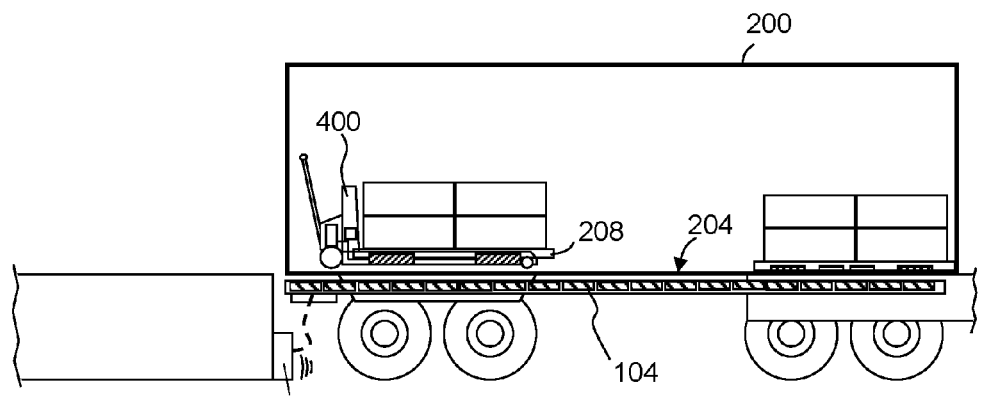
FIG. 5 illustrates a simplified block diagram, cross-sectional view of an exemplary product load and/or unload system with an exemplary pallet jack positioned within a storage area of a delivery vehicle, in accordance with some embodiments.

FIG. 4 illustrates a simplified, partial cross-sectional view of an exemplary pallet lift system 102 incorporated with and/or secured to a pallet jack 400, in accordance with some embodiments. FIG. 5 illustrates a simplified block diagram, cross-sectional view of an exemplary product load and/or unload system 100 with an exemplary pallet jack 400, supporting a pallet 208 with products, positioned within a storage area of a delivery vehicle 200 and proximate one or more exemplary magnetic levitation tracks 104 positioned relative to a delivery vehicle 200, in accordance with some embodiments. Referring to FIGS. 4-5, in some applications, the pallet lift system 102 is part of or includes a pallet jack 400. The series of pallet lift magnets 302 are positioned along portions of an underside of the pallet jack. For example, multiple pallet lift magnets 302 may be positioned long undersurfaces of each of the forks 402 of the pallet jack, and in some instances may additionally include one or more pallet lift magnets along an undersurface of a cross frame 404. The control circuit 106 and/or a pallet lift system control circuit 306 may be included and coupled with a rechargeable power source 304. The pallet lift system 102 can similarly be cooperated with other such pallet transport systems.

Referring to FIGS. 1-5, the pallet lift magnets magnetically interact with the magnetic levitation track to apply a lifting force to the pallet 208 and products 210 and/or packages supported by the pallet. In some implementations the pallet lift magnets may include a series of permanent magnets that are distributed about an area of a bottom surface of the pallet. Additionally or alternatively, in some embodiments the series of pallet lift magnets can comprise electromagnets and/or superconducting magnets. The control circuit 106 may be included in the pallet lift system 102 or be in communication with a separate pallet lift system control circuit 306 that activates the rechargeable power source 304 to delivery power to the electromagnets, superconductor magnets, other such power activated magnet systems and/or combination of such magnet systems. The pallet lift magnets are fixed to the pallet and/or the pallet lift system temporarily cooperates with the separate pallet such that the pallet lift magnets 302 are secured and positioned to be proximate a surface over which the pallets 208 is to be transported, such as the floor 204 of the storage area of the delivery vehicle 200.

Similarly, the magnetic levitation track 104 includes a series of track magnets 214. Still referring to FIGS. 1-5, one or more of the track magnets 214 of the series of track magnets may be permanent magnets distributed along a length of the track. Additionally or alternatively, one or more of the track magnets may be electromagnetic magnets and/or superconducting magnets. The track magnets 214 may be positioned in one or more rows, and typically comprise one or more arrays of track magnets arranged one or more grids. The control circuit 106 may be part of the magnetic levitation track or may be in communication with a separate track control circuit 206. In some implementations, the control circuit 106 is in wireless communication with the track control circuit to cause power to be supplied to the one or more electromagnetics of the series of track magnets 214. A rechargeable power source may be included and/or coupled with the magnetic levitation track. Additionally or alternatively, the magnetic levitation track may be configured with one or more power cords that can connect to an external power source, such as a power source at the loading dock 202, in a floor of a loading bay or other source.

When the pallet lift system 102 is positioned adjacent the magnetic levitation track 104, and when relevant one or both of the pallet lift system and the magnetic levitation track are activated, magnetic forces are established between the pallet lift system 102 and the magnetic levitation track. This induces a lifting force on the pallet 208 cooperated with the pallet lift system. Again, the control circuit 106 is configured to control an activation of one of the series of pallet lift magnets 302 of the pallet lift system 102 and the series of track magnets 214 of the magnetic levitation track 104 when and/or in response to a pallet 208 being positioned relative to the storage area of the delivery vehicle. For example, a sensor may detect the pallet being moved to a position just outside the delivery vehicle and can activate one or both of the pallet lift system and the magnetic levitation track. In other instances, a worker may activate the control circuit 106 to activate one or both of the pallet lift system and the magnetic levitation track. Additionally or alternatively, the control circuit 306 of the pallet lift system may cause a transceiver of the pallet lift system to wirelessly communicate a notification in response to the pallet lift system control circuit detecting a current location and/or determining it is within a threshold distance of the loading dock 202, an end of the loading dock, the delivery vehicle or the like. For example, the pallet lift system may include one or more sensors for detecting and/or determining distances, current location, movement (e.g., inertial sensors, accelerometer, optical scanner, optical light emitting location information detector, GPS data, etc.), or other such detectors, and can trigger a communication to cause an activation of one or both of the magnetic levitation track and the pallet lift system. In other instances a laser or optical sensor may detect the pallet crossing a threshold and communicate the detection to the control circuit 106. Additionally or alternatively, the pallet lift system 102 and/or the pallet 208 may include an identifier, such as a bar code or the like that can be detected by a scanner as a confirmation that a pallet is approaching the delivery vehicle and/or being removed from the delivery vehicle. This can be communicated to the control circuit 106 to track the pallet and/or pallet lift system (e.g., as a confirmation of inventory movement), and can cause the control circuit to activate one or both of the pallet lift system and the magnetic levitation system. Still further, some embodiments may include one or more additional magnetic levitation tracks in the floor of the loading dock 202 and/or other areas of a storage area of the facility, and as the pallet lift force is moved along the additional magnetic levitation tracks, the control circuit 106 may be configured to identify a location of the pallet lift system based on the detected change in magnetic properties. When the pallet lift system is within a threshold distance of the magnetic levitation track 104, the control circuit can continue to maintain the pallet lift system activate and/or activate the magnetic levitation track.

The magnetic forces established between the series of pallet lift magnets and the series of track magnets induces a lifting force on the series of pallet lift magnets of the first pallet lift system. This lifting force is further transferred to the pallet reducing a force applied by the pallet, and one or more products supported by the pallet, on the floor 204 of the storage area of the delivery vehicle. The reduced force allows for a reduced friction movement of the pallet along the length of the magnetic levitation track and the floor of the storage area of the delivery vehicle adjacent the track. In some embodiments, the induced magnetic forces are such that the lifting force on the series of pallet lift magnets 302 elevates the pallet, and one or more products supported by the pallet, off of the floor 204 of the storage area of the delivery vehicle 200 and allowing movement of the pallet above the track 104 and the floor of the storage area of the first delivery vehicle. The elevation can, in some implementations provide a substantially friction free movement of the pallet and the pallet lift system along the track 104.

Similarly, when a pallet jack 400 is used, the magnetic force established between the pallet lift magnets 302 cooperated with the pallet jack and the track magnets 214 induces the lifting force on the series of pallet lift magnets at least reducing a force applied by the pallet jack 400, the pallet 208 and the products on the pallet. In some embodiments, the magnetic forces are such that the pallet jack, the pallet and the one or more products supported by the pallet, are elevated off of the floor 204 of the storage area of the delivery vehicle and allows movement of the pallet jack above the track and the floor of the storage area of the delivery vehicle.

For example, in some embodiments, the series of track magnets 214 comprise electromagnets, and the control circuit controls the delivery of electrical power from an electrical power source to the track to activate of the electromagnets. Further, in some applications, the control circuit in controlling the electrical power to the electromagnets of the series of track magnets directs power to the electromagnets inducing the lifting force on the pallet lift magnets elevating the pallet, and the one or more products supported by the pallet (and in some instances a pallet jack), off of the floor 204 of the storage area and enables substantially friction free movement of the pallet above the track and the floor of the storage area of the delivery vehicle adjacent to where the track is positioned.

In some implementations, the control circuit 106 and/or a track control circuit 206 of the magnetic levitation track can control the activation and deactivation of one or more track magnets 214 and/or sub-sets of track magnets. For example, one or more track magnets 214 and/or sections of track magnets of the magnetic levitation track can be shut down after a pallet or pallets have been placed in desired locations in the delivery vehicle 200. This can prevent movement of the pallets, and reduce power consumption. Additionally or alternatively the pallets can be secured to the location where they are placed in the delivery vehicle. For example, after being moved along the magnetic levitation track to a desired location, the pallets can be secured into the desired location through one or more tethers, ropes, latches or the like that cooperate with the sides, front, floor and/or roof of the storage area of the delivery vehicle.

The magnetic levitation track 104 is positioned adjacent to, within and/or forms part of the floor 204 of a storage area of the delivery vehicle 200. In some embodiments, the magnetic levitation track is secured with the delivery vehicle under at least portions of the floor 204 of the delivery vehicle. The track can further include and/or be cooperated with a support system 220 that supports the magnetic levitation track and the series of track magnets. In some applications, the support system 220 is fixed with the delivery vehicle such that the track 104 moves with the delivery vehicle as the delivery vehicle is moved. A power source may also be secured with and travel with the magnetic levitation track and the delivery vehicle (which may also provide power to the delivery vehicle, a refrigerator section of the delivery vehicle and the like, and/or the track may receive power from an external power source when the delivery vehicle is positioned at a loading dock. In other embodiments, the track 104 is separate from the delivery vehicle 200 and can moved into and out of position relative to the delivery vehicle.

In some embodiments, one or more magnets of one or both the pallet lift system and the magnetic levitation track may be powered down when the pallet is in a desired location. Location information may be used to detect a location of the pallet and deactivate the one or more magnets. Additionally or alternatively, the track control circuit may detect a location of the pallet lift system based on feedback from the one or more magnets corresponding to changes and/or levels of magnetic forces. Based on the determined location, the track control circuit can deactivate one or more magnets to allow the pallet to settle to the floor 204.

Figure 6:
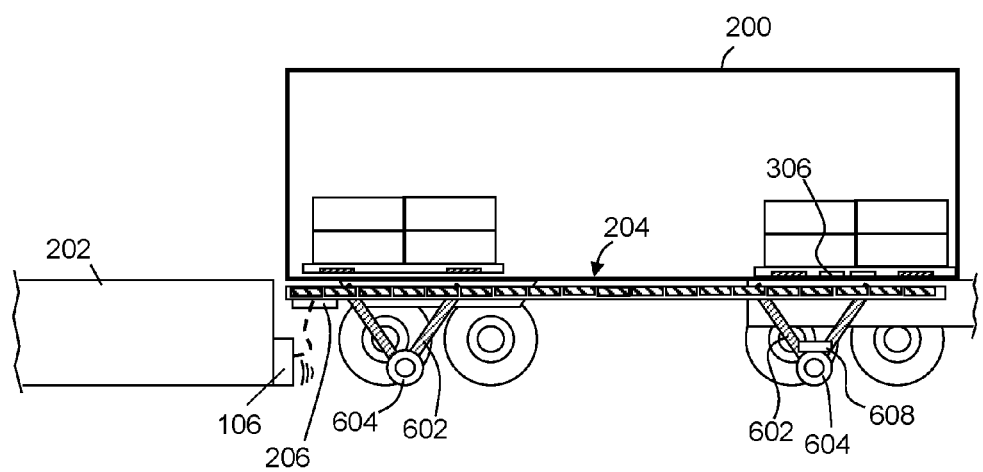
FIG. 6 illustrates a simplified block diagram of a cross-sectional view of an exemplary product load and/or unload system with one or more exemplary magnetic levitation tracks positioned relative to a delivery vehicle, in accordance with some embodiments.

FIG. 6 illustrates a simplified block diagram of a cross-sectional view of an exemplary product load and/or unload system 100 with one or more exemplary magnetic levitation tracks 104 positioned relative to a delivery vehicle 200, in accordance with some embodiments. In some implementations, the magnetic levitation track includes and/or is cooperated with one or more support systems 602 that support the magnetic levitation track and the series of track magnets 214. One or more wheels 604, rollers, tracks, or the like can be secured with the support system 602 allowing movement of the magnetic levitation track at least into and out of position relative to delivery vehicles as they are driven adjacent to the loading dock 202 and away from the loading dock. The support system 602 may extend from the magnetic levitation track to the wheels 604, and/or may include a frame that extends along some or all of a length of the track providing support for the track and/or the track magnets. The support system and wheels enable movement of the track 104 such that the track is separate from the delivery vehicle 200 and is movable to temporarily be moved into position exterior to and adjacent the floor 204 of the storage area of the delivery vehicle while one or more pallets are being loaded on or unloaded from the delivery vehicle, and be moved away from the delivery vehicle when no longer needed.

In some embodiments, one or more motors 608 may be included with user interface controls to allow a worker to control the motors in moving the magnetic levitation track into and out of position relative to a delivery vehicle. The support system 602, in some embodiments, may include one or more pistons, hinges, pivot joints, and/or other such mechanisms that allow the magnetic levitation track to be raised and lowered. This can allow for a more simplified positioning of the magnetic levitation track relative to the floor 204 of the delivery vehicle, and removal of the magnetic levitation track away from the delivery vehicle. Still further, in some applications, one or more hinges (e.g., accordion hinges), pivot joints, etc., that allow the track to bend at one or more locations along a length to aid in positioning and removing the magnetic levitation track relative to the delivery vehicles.

Figure 7:
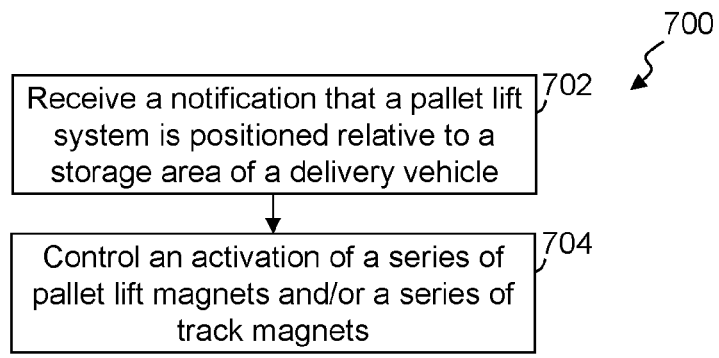
FIG. 7 illustrates a simplified flow diagram of a process of loading and/or unloading a delivery vehicle utilizing a magnetic levitation load system, in accordance with some embodiments.

FIG. 7 illustrates a simplified flow diagram of a process 700 of loading and/or unloading a delivery vehicle 200 utilizing a magnetic levitation load system, in accordance with some embodiments. In step 702, a notification is received that a pallet lift system 102 of multiple pallet lift systems is positioned relative to a storage area of a delivery vehicle 200. Again, each of the multiple pallet lift systems comprises a series of pallet lift magnets secured and positioned to be proximate a surface (e.g., floor 204 of the delivery vehicle) over which the pallets are transported. The lift magnets enable a pallet with which they are cooperated to be moved in and out of storage areas of delivery vehicles. The notification can be caused by a worker activating a button at the loading dock 202, a button in the delivery vehicle, a button directly coupled to the track control circuit 206 of the magnetic levitation track, a button on a forklift, pallet jack or the like that communicates to the control circuit 106 and/or the track control circuit 206, a button on a user interface unit (e.g., portable bar code scanner, smart phone, tablet, smart watch, etc.), or other such button. In other implementations, the notification may be in response to a sensor detecting the pallet 208 and corresponding products, such as an optical detector that detects a pallet, a bar code reader that detects a bar code on a pallet or product supported by the pallet, a weight sensor that detects the weight of a forklift, pallet jack or the like, other such sensors, or combination of two or more of such sensors, button and the like.

In step 704, a control circuit controls an activation of a series of pallet lift magnets 302 of a pallet lift system 102 and/or a series of track magnets 214 of a magnetic levitation track 104 that is positioned adjacent the floor 204 of a storage area of a delivery vehicle 200. In some applications, the control of the activation is in response to the notification that the pallet being positioned relative to the storage area of the delivery vehicle. The activation causes magnetic forces to be established between the series of pallet lift magnets and the series of track magnets inducing a lifting force on the series of pallet lift magnets 302 of the pallet lift system 102, and reduces a force applied by the pallet, and one or more products supported by the pallet, on the floor 204 of the storage area of the delivery vehicle 200. The lifting force further allows a reduced friction movement of the pallet along the magnetic levitation track 104 and the floor 204 of the storage area of the delivery vehicle 200. In some implementations, the control of the activation provides for the activation of at least one or more electromagnets, superconductor magnets and/or other types of magnets of the series of pallet lift magnets 302 of the pallet lift system. Additionally or alternatively, the controlling the activation can include controlling the delivery of electrical power from an electrical power source to electromagnets of the series of track magnets 214 to activate of the electromagnets. The power source may be a rechargeable power source of the magnetic levitation track, may be an external power source, or combination thereof.

In some embodiments, two or more of the series of pallet lift magnets are temporarily cooperated with the pallet 208 with first series of pallet lift magnets being positioned along portions of an area of the first pallet and typically equally distributed about an area of the pallet defined by a bottom support surface of the pallet. The distributed pallet lift magnets provide for the induced lifting force on the series of pallet lift magnets to elevate the pallet, and one or more products supported by the pallet, off of the floor 204 of the storage area of the delivery vehicle 200, and allows movement of the pallet above the track and the floor of the storage area of the delivery vehicle. In some instances, the electrical power is controlled to the electromagnets of the series of track magnets directing power to the electromagnets inducing the lifting force on the pallet lift magnets elevating the pallet, and the one or more products supported by the pallet, off of the floor of the storage area and enabling friction free movement of the pallet above the track and the floor of the storage area of the first delivery vehicle.

In some embodiments, the magnetic levitation track is separate from the delivery vehicle and is moved into position. Accordingly, the control circuit may causing the magnetic levitation track to temporarily be moved into position exterior to and adjacent the floor 204 of the storage area of the delivery vehicle 200 while one or more pallets are being loaded on or unloaded from the delivery vehicle. For example, the control circuit may issue one or more commands to workers (e.g., through text message, displaying on screen, generating an audible alert, causing one or more lights to be activated and/or flashed, and/or other such notifications), activate one or more motors 608 and/or steering mechanisms, causing the magnetic levitation track to be raised or lowered, and/or other such manual and automated actions. Additionally or alternatively, some embodiments further temporarily communicatively couple the control circuit with the series of track magnets of the magnetic levitation track that is fixed, through a support system that supports the series of track magnets, with the delivery vehicle such that the track moves with the delivery vehicle as the delivery vehicle is moved.

Figure 8:
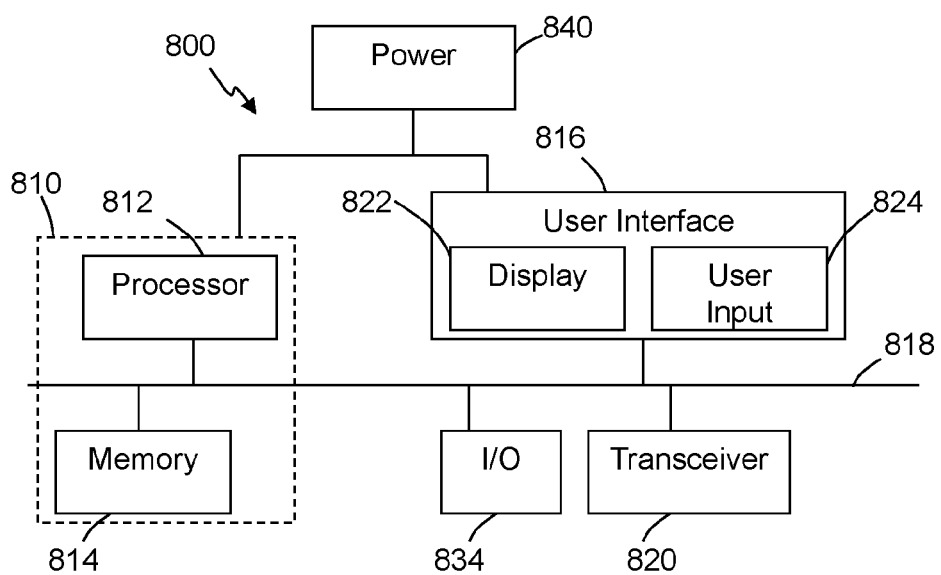
FIG. 8 illustrates an exemplary system for use in implementing methods, techniques, devices, apparatuses, systems, servers, sources and the like in loading and/or unloading products in accordance with some embodiments.

Further, the processes, methods, techniques, circuits, circuitry, systems, devices, functionality, services, servers, sources and the like described herein may be utilized, implemented and/or run on many different types of devices and/or systems. Referring to FIG. 8, there is illustrated an exemplary system 800 that may be used for any such implementations, in accordance with some embodiments. One or more components of the system 800 may be used for implementing any circuitry, system, functionality, apparatus, process, or device mentioned above or below, or parts of such circuitry, functionality, systems, apparatuses, processes, or devices, such as for example any of the above or below mentioned system control circuit 106, track control circuit 206, pallet lift system control circuit 306, inventory system 110, user interface unit, and/or other such circuitry, functionality and/or devices. However, the use of the system 800 or any portion thereof is certainly not required.

By way of example, the system 800 may comprise a controller circuit or processor module 810, memory 814, and one or more communication links, paths, buses or the like 818. Some embodiments may include a user interface 816, and/or a power source or supply 840. The controller 812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller 812 can be part of control circuitry and/or a control system 810, which may be implemented through one or more processors with access to one or more memory 814. The user interface 816 can allow a user to interact with the system 800 and receive information through the system. In some instances, the user interface 816 includes a display 822 and/or one or more user inputs 824, such as a buttons, touch screen, track ball, keyboard, mouse, etc., which can be part of or wired or wirelessly coupled with the system 800.

Typically, the system 800 further includes one or more communication interfaces, ports, transceivers 820 and the like allowing the system 800 to communication over a communication bus, a distributed network 108 (e.g., a local network, the Internet, WAN, etc.), communication link 818, other networks or communication channels with other devices and/or other such communications or combinations thereof. Further the transceiver 820 can be configured for wired, wireless, optical, fiber optical cable or other such communication configurations or combinations of such communications. Some embodiments include one or more input/output (I/O) ports 834 that allow one or more devices to couple with the system 800. The I/O ports can be substantially any relevant port or combinations of ports, such as but not limited to USB, Ethernet, or other such ports.

The system 800 comprises an example of a control and/or processor-based system with the controller 812. Again, the controller 812 can be implemented through one or more processors, controllers, central processing units, logic, software and the like. Further, in some implementations the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory 814 can be internal, external or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store code, software, executables, scripts, data, content, lists, programming, programs, log or history data, user information and the like.

Some embodiments provide electromagnetic and/or superconducting levitating trailer pallet loading systems. The pallet lift system, in some applications, may include metal strips that float over the floor of a delivery vehicle to allow easier loading, movement and/or position of the pallet in the delivery vehicle and/or the removal of pallets. When a pallet is placed at a desired position, one or more sections of the track can be deactivated and/or the pallet lift system can be deactivated. Additionally or alternatively, when a storage area of a delivery vehicle is loaded, the magnetic levitation system that is at least temporarily associated with the delivery vehicle can be slowly turned off, and the pallets settle for transport. The sequencing of the pallet loading can be based on artificial intelligence and understanding of the interlock capabilities among pallets, and/or the products on the pallets (e.g., product priorities, desired unload procedures, etc.).

The loading of pallets into and the removal of pallets from a delivery vehicle can be difficult and can cause damage to the delivery vehicle and/or the loading dock. For example, pallet jacks can be hard on floors and often require some strength to maneuver in tight areas. As workers move pallets around the delivery vehicle, shopping facility and/or storage areas, the pallet jacks may leave scuff marks. Further, small rocks or other items frequently get under the rollers of the pallet jack also leaving marks, causing damage to the floor, and/or make the pallet jack more difficult to move. Further, rollers on the pallet jacks wear out after frequent use and have to be replaced. Further, the use of forklifts may be limited as they often cannot be driven into the delivery vehicle.

Accordingly, some embodiments provide the enhanced product loading and/or unloading system 100. In some embodiments, the pallet lift systems may include one or more hover boards to lift a pallet and products supported by the pallet. The load/unload system control circuit can interface with a central computer, inventory system, and other such systems to know what pallets to move, what pallets are being moved, what products to move, activate one or both of the pallet lift system and/or magnetic levitation track, and a pallet lift system is navigating into the delivery vehicle, controlling navigation of the pallet lift system (e.g., uses image processing, digital 3D mapping of the loading area, delivery vehicle, etc.). While and/or after pallets are loaded or unloaded, 3D maps of an interior of the delivery vehicle can be updated. In some applications, the control circuit autonomously pilots the pallet lift system by tracking movement of the pallet lift system using image processing, inertial sensors, GPS data, other sensor data from the pallet lift system and/or external to the pallet lift system, and/or other such information. In some applications, the pallet lift system may include additional propulsion motors (e.g., wheels, propellers, etc.) to move the pallet horizontally left, right, forward, and backwards based on navigation. Some embodiments provide additional controls to enable the movement of the pallet lift system and/or the magnetic levitation track to different levels. In some instances, for example, a pallet lift system may be controlled to be at the lowest level without contacting a pallet to come under a portion of a pallet. The magnetic lift force can be controlled to cause the pallet lift system to increase a separation from the magnetic levitation track to lift a pallet. In some embodiments, multiple pallet lift systems may be utilized with a single pallet that synchronously operate together to induce a balanced lift force on the pallet. Additionally or alternatively, multiple pallet lift systems can be cooperated with a pallet jack (e.g., one for each fork or arm, and potentially one for a cross-support of the pallet jack. Again, one or more of the pallet lift systems may temporarily cooperate with a pallet (e.g., being inserted prior to movement, and removed when positioned at a desired location). In other implementations, one or more pallet lift systems can be part of a pallet such that the pallets themselves may be able to hover over the floor.

In some embodiments, systems, apparatuses and methods are provided to aid in loading and/or unloading a delivery vehicle. Some embodiments include product load systems, comprising: multiple pallet lift systems configured to enable pallets, which are configured to receive and support products to be shipped by delivery vehicles, to be moved in and out of a storage area of a delivery vehicle, wherein each of the multiple pallet lift systems comprises a series of pallet lift magnets secured and positioned to be proximate a surface over which the pallets are transported; a magnetic levitation track comprising a series of track magnets, wherein the magnetic levitation track is configured to be positioned adjacent a floor of a storage area of a first delivery vehicle; and a control circuit communicatively coupled with and configured to control an activation of one of the series of pallet lift magnets of a first pallet lift system and the series of track magnets in response to a first pallet being positioned relative to the storage area of the first delivery vehicle such that magnetic forces established between the series of pallet lift magnets and the series of track magnets induces a lifting force on the series of pallet lift magnets of the first pallet lift system, and reduces a force applied by the first pallet, and one or more products supported by the first pallet, on the floor of the storage area of the first delivery vehicle and allows reduced friction movement of the first pallet along the magnetic levitation track and the floor of the storage area of the first delivery vehicle.

Some embodiments provide methods of loading and unloading a delivery vehicle, comprising: by a control circuit of a product loading system: receiving a notification that a first pallet lift system of multiple pallet lift systems is positioned relative to a storage area of a first delivery vehicle, wherein each of the multiple pallet lift systems comprises a series of pallet lift magnets secured and positioned to be proximate a surface over which the pallets are transported and are configured to enable pallets, which are configured to receive and support products to be shipped by delivery vehicles, to be moved in and out of storage areas of the delivery vehicles; and controlling an activation of one of a series of pallet lift magnets of the first pallet lift system and a series of track magnets of a magnetic levitation track positioned adjacent a floor of the storage area of the first delivery vehicle, in response to the notification that the first pallet being positioned relative to the storage area of the first delivery vehicle, such that magnetic forces established between the series of pallet lift magnets and the series of track magnets inducing a lifting force on the series of pallet lift magnets of the first pallet lift system, and reduces a force applied by the first pallet, and one or more products supported by the first pallet, on the floor of the storage area of the first delivery vehicle and allows reduced friction movement of the first pallet along the magnetic levitation track and the floor of the storage area of the first delivery vehicle.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product load system, comprising:
   multiple pallet lift systems configured to enable pallets, which are configured to receive and support products to be shipped by delivery vehicles, to be moved in and out of a storage area of a delivery vehicle, wherein each of the multiple pallet lift systems comprises a series of pallet lift magnets secured and positioned to be proximate a surface over which the pallets are transported;
   a magnetic levitation track comprising a series of track magnets, wherein the magnetic levitation track is configured to be positioned adjacent a floor of a storage area of a first delivery vehicle; and
   a control circuit communicatively coupled with and configured to control an activation of one of the series of pallet lift magnets of a first pallet lift system and the series of track magnets in response to a first pallet being positioned relative to the storage area of the first delivery vehicle such that magnetic forces established between the series of pallet lift magnets and the series of track magnets induces a lifting force on the series of pallet lift magnets of the first pallet lift system, and reduces a force applied by the first pallet, and one or more products supported by the first pallet, on the floor of the storage area of the first delivery vehicle and allows reduced friction movement of the first pallet along the magnetic levitation track and the floor of the storage area of the first delivery vehicle;
   wherein the magnetic levitation track further comprises:
   a support system that supports the series of track magnets; and
   one or more wheels secured with the support system enabling movement of the magnetic levitation track such that the magnetic levitation track is separate from the first delivery vehicle and is movable to temporarily be moved into position exterior to and adjacent the floor of the storage area of the first delivery vehicle while one or more pallets are being loaded on or unloaded from the first delivery vehicle, and be moved away from the first delivery vehicle.

2. The system of claim 1, wherein the series of pallet lift magnets comprises electromagnets, and wherein the control circuit controls the activation of the electromagnets.

3. The system of claim 1, wherein the first pallet lift system comprises a pallet jack, wherein a first series of pallet lift magnets are positioned along portions of an underside of the pallet jack such that the lifting force on the first series of pallet lift magnets elevates the pallet jack, the first pallet and the one or more products supported by the first pallet, off of the floor of the storage area of the first delivery vehicle and allowing movement of the pallet jack above the magnetic levitation track and the floor of the storage area of the first delivery vehicle.

4. The system of claim 1, wherein the first pallet lift system of the multiple pallet lift systems is temporarily cooperated with the first pallet with the first series of pallet lift magnets being positioned along portions of an area of the first pallet such that the lifting force on the first series of pallet lift magnets elevates the first pallet, and one or more products supported by the first pallet, off of the floor of the storage area of the first delivery vehicle and allowing movement of the first pallet above the magnetic levitation track and the floor of the storage area of the first delivery vehicle.

5. The system of claim 1, wherein the series of track magnets comprises electromagnets, and wherein the control circuit is configured to control the delivery of electrical power from an electrical power source to the magnetic levitation track to activate the electromagnets.

6. The system of claim 5, wherein the control circuit in controlling the electrical power to the electromagnets of the series of track magnets directs power to the electromagnets inducing the lifting force on the pallet lift magnets elevating the first pallet, and the one or more products supported by the first pallet, off of the floor of the storage area and enabling friction free movement of the first pallet above the magnetic levitation track and the floor of the storage area of the first delivery vehicle.

7. A method of loading and unloading a delivery vehicle, comprising:
   by a control circuit of a product loading system:
   receiving a notification that a first pallet lift system of multiple pallet lift systems is positioned relative to a storage area of a first delivery vehicle, wherein each of the multiple pallet lift systems comprises a series of pallet lift magnets secured and positioned to be proximate a surface over which the pallets are transported and are configured to enable pallets, which are configured to receive and support products to be shipped by delivery vehicles, to be moved in and out of storage areas of the delivery vehicles;

controlling an activation of one of a series of pallet lift magnets of the first pallet lift system and a series of track magnets of a magnetic levitation track positioned adjacent a floor of the storage area of the first delivery vehicle, in response to the notification that the first pallet being positioned relative to the storage area of the first delivery vehicle, such that magnetic forces established between the series of pallet lift magnets and the series of track magnets inducing a lifting force on the series of pallet lift magnets of the first pallet lift system, and reduces a force applied by the first pallet, and one or more products supported by the first pallet, on the floor of the storage area of the first delivery vehicle and allows reduced friction movement of the first pallet along the magnetic levitation track and the floor of the storage area of the first delivery vehicle; and causing the magnetic levitation track to temporarily be moved into position exterior to and adjacent the floor of the storage area of the first delivery vehicle while one or more pallets are being loaded on or unloaded from the first delivery vehicle.

8. The method of claim 7, wherein the controlling the activation comprises activating electromagnets of the series of pallet lift magnets of the first pallet lift system.

9. The method of claim 7, wherein the controlling the activation comprises activating a first series of pallet lift magnets positioned along portions of an underside of a pallet jack; and inducing the lifting force on the first series of pallet lift magnets elevating the pallet jack, the first pallet and the one or more products supported by the first pallet, off of the floor of the storage area of the first delivery vehicle and allowing movement of the pallet jack above the magnetic levitation track and the floor of the storage area of the first delivery vehicle.

10. The method of claim 7, further comprising:

temporarily cooperating the series of pallet lift magnets with the first pallet, wherein the first series of pallet lift magnets are positioned along portions of an area of the first pallet, such that the induced lifting force on the first series of pallet lift magnets elevating the first pallet, and one or more products supported by the first pallet, off of the floor of the storage area of the first delivery vehicle and allowing movement of the first pallet above the magnetic levitation track and the floor of the storage area of the first delivery vehicle.

11. The method of claim 7, wherein the controlling the activation comprises controlling the delivery of electrical power from an electrical power source to electromagnets of the series of track magnets to activate of the electromagnets.

12. The method of claim 11, wherein the controlling the electrical power to the electromagnets of the series of track magnets comprises directing power to the electromagnets inducing the lifting force on the pallet lift magnets elevating the first pallet, and the one or more products supported by the first pallet, off of the floor of the storage area and enabling friction free movement of the first pallet above the magnetic levitation track and the floor of the storage area of the first delivery vehicle.

13. The method of claim 7, further comprising:

temporarily communicatively coupling the control circuit with the series of track magnets of the magnetic levitation track.

14. The system of claim 1, wherein the magnetic levitation track comprises a motor configured to drive at least one wheel of the one or more wheels to cause movement of the magnetic levitation track into and out of position adjacent the floor of the storage area of the first delivery vehicle.

15. The system of claim 14, wherein the support system comprises mechanisms to enable the raising and lowering of the magnetic track system.

16. The system of claim 1, further comprising one or more hinges enabling the magnetic levitation track to bend at one or more locations along a length of the magnetic levitation track.

17. The system of claim 5, wherein the control circuit is further configured to obtain location information of the first pallet and control activation and deactivation of one or more of the track magnets based on a determined location of the first pallet.

18. The method of claim 7, further comprising:

controlling mechanisms to raise and lower the magnetic track system relative to the floor of the storage area of the first delivery vehicle.

19. The method of claim 7, further comprising:

obtaining location information of the first pallet; and controlling activation and deactivation of one or more of the track magnets based on a determined location of the first pallet.

* * * * *